US008606943B2

(12) United States Patent
Appe et al.

(10) Patent No.: US 8,606,943 B2
(45) Date of Patent: Dec. 10, 2013

(54) METHOD FOR PROCESSING APPLICATION COMMANDS FROM PHYSICAL CHANNELS USING A PORTABLE ELECTRONIC DEVICE AND CORRESPONDING DEVICE AND SYSTEM

(75) Inventors: Xavier Appe, Meudon Cedex (FR); Fabien Quatravaux, Meudon Cedex (FR)

(73) Assignee: Gemalto S.A., Meudon (FR)

( * ) Notice: Subject to any disclaimer, the term of this patent is extended or adjusted under 35 U.S.C. 154(b) by 950 days.

(21) Appl. No.: 12/601,796

(22) PCT Filed: May 23, 2008

(86) PCT No.: PCT/IB2008/001301
§ 371 (c)(1),
(2), (4) Date: Nov. 24, 2009

(87) PCT Pub. No.: WO2008/146125
PCT Pub. Date: Dec. 4, 2008

(65) Prior Publication Data
US 2010/0175067 A1 Jul. 8, 2010

(30) Foreign Application Priority Data

May 25, 2007 (EP) .................................... 07301066

(51) Int. Cl.
*G06F 15/16* (2006.01)
(52) U.S. Cl.
USPC ............................ 709/229; 709/223; 370/468
(58) Field of Classification Search
USPC ........................................................ 709/229
See application file for complete search history.

(56) References Cited

U.S. PATENT DOCUMENTS

| 4,751,634 | A | * | 6/1988 | Burrus et al. ................... 710/63 |
| 6,105,084 | A | * | 8/2000 | Dobbelaere et al. ............ 710/40 |
| 6,154,800 | A | * | 11/2000 | Anand .......................... 710/107 |
| 6,813,767 | B1 | * | 11/2004 | Willke .......................... 718/101 |
| 7,913,037 | B2 | * | 3/2011 | Nakajima et al. ............. 711/114 |
| 2003/0054829 | A1 | * | 3/2003 | Moisio .......................... 455/452 |
| 2003/0074465 | A1 | * | 4/2003 | Tang et al. .................... 709/237 |
| 2003/0103556 | A1 | * | 6/2003 | Han ............................. 375/148 |

(Continued)

FOREIGN PATENT DOCUMENTS

| EP | 1630727 A2 | 3/2006 |
| JP | 2007-087168 A | 4/2007 |
| WO | 0104750 A1 | 1/2001 |
| WO | 2006/051465 A1 | 5/2006 |

OTHER PUBLICATIONS

Office Action in Japanese Patent Application No. 200880100336.8 dated Mar. 5, 2012, with English Translation (15 pages).

(Continued)

*Primary Examiner* — Hamza Algibhah
(74) *Attorney, Agent, or Firm* — Osha Liang LLP

(57) ABSTRACT

The invention relates to a method for processing at least two application commands from at least two physical communication channels respectively using a portable electronic device. The method includes receiving each application command from one of the physical communication channels, determining a priority level associated with each application command, comparing priority levels and identifying the application command with the highest priority among the application commands and processing of the application command with highest priority. The invention also relates to the portable electronic device and an electronic system including a host device cooperating with such a portable electronic device.

27 Claims, 2 Drawing Sheets

(56) References Cited

U.S. PATENT DOCUMENTS

| | | | |
|---|---|---|---|
| 2003/0112824 A1* | 6/2003 | Acosta | 370/474 |
| 2005/0105117 A1* | 5/2005 | Oh et al. | 358/1.13 |
| 2005/0201403 A1* | 9/2005 | Wang | 370/412 |
| 2007/0136797 A1* | 6/2007 | Tanabikiq et al. | 726/6 |
| 2008/0147894 A1* | 6/2008 | Lu | 710/6 |
| 2008/0228976 A1* | 9/2008 | Wei et al. | 710/110 |
| 2008/0228978 A1* | 9/2008 | Wei et al. | 710/244 |
| 2008/0229084 A1* | 9/2008 | Wei et al. | 712/244 |

OTHER PUBLICATIONS

Gordon, C.R., "Dynamic Priority Assignment Circuit," IBM Technical Disclosure Bulletin, IBM Corporation, vol. 9, No. 10, Mar. 1967 (2 pages).

Tanenbaum, A.S., "Modern Operating Systems, Processes and Threads," Modern Operating Systems, 2001 (34 pages).

International Search Report and Written Option in PCT/IB2008/001301 mailed Sep. 1, 2008 (11 pages).

* cited by examiner

METHOD FOR PROCESSING APPLICATION COMMANDS FROM PHYSICAL CHANNELS USING A PORTABLE ELECTRONIC DEVICE AND CORRESPONDING DEVICE AND SYSTEM

BACKGROUND

1. Field of the Invention

In general, the invention relates to a method for processing two application commands from at least two physical communication channels respectively, using a portable electronic device.

The invention also relates to a portable electronic device and an electronic system with a host device that cooperates with such a portable electronic device.

2. Background Art

The words "portable electronic device" refer to any device with means for processing and communicating information and capable of exchanging data with the outside. Typically, a portable electronic device can take the form of an IC card, such as for instance a SIM (acronym for Subscriber Identity Module) card comprising at least one microprocessor, at least two communication interfaces and at least one memory. Each communication interface is responsible for communication through one associated physical communication channel.

The portable electronic device may cooperate with a host device to use, at least in part, one or more applications supported by the portable electronic device through the host device.

The host device may particularly be a mobile telephone, a PDA (acronym for Personal Digital Assistant) and/or a PC (acronym for Personal Computer). The host device may be connected by radiofrequency waves to one or more wireless communication networks and/or a wired network. For example, the wired network may be a network of the Internet type. The wireless communication network may be wireless telephone network and/or a network of contactless terminals, such as for those used for instance to provide transport services such as bus and/or underground transport services.

The transmission from a mobile telephone to an IC card via a physical communication channel of the ISO (acronym for International Standardization Organization) 7816 type, called the contact type, of one or more application commands using APDUs (acronym for Application Protocol Data Unit) is known. The IC card processes the application command or commands from the physical ISO 7816 channels in the order in which they are received. Then the IC card sends back a corresponding response to the mobile telephone, via the same physical channel, through APDUs.

Transmission from a contactless reader terminal to an IC card via a physical communication channel of the ISO 14443 type, called the contactless type, of one or more application commands using APDUs is also known. These may for example include a command to access an area with restricted access. The IC card processes the command from the physical ISO 14443 channel and sends back a response that authorizes access to the restricted access area by the holder of the card or denies such access.

Further, transmission from a terminal such as a PC to an IC card through several physical communication channels, for example one of the ISO 7816 contact type, and at least one other channel of the USB (acronym for Universal Serial Bus) type is also known. To date, when the IC card is accessible via several physical communication channels, the application command of a single physical communication channel is handled at a given instant. As a result, the IC card handles the application commands from the different physical communication channels in their order of arrival.

However, such known solutions have a major drawback. When the IC card receives a series of application commands from different physical channels, the application commands received are stored and thus put on standby before they are handled sequentially, regardless of their provenance.

Putting application commands from one physical channel that requires a fairly short predetermined time on standby in this way is harmful for the transaction initiated on the relevant physical channel, as the predetermined response time for the processing runs out.

For example, an IC card works with a mobile telephone connected to a wireless telephone network through a physical channel of the ISO 7816 contact type. The card is processing a command, say, for authenticating the user of the IC card, which is already initiated for a contact type application. When the IC card is polled by a reader terminal for a so-called Tap & Go contactless application to enable access to a transport service, for instance, the IC card is already busy processing the user authentication command from the physical contact channel.

Such a known contactless Tap & Go application involves an IC card contained in a mobile telephone and a contactless reader terminal. When the IC card is brought close to the reader terminal, an electronic payment command is sent to the card, which responds in a short time by debiting the credit account of the card holder to validate the transaction.

The corresponding Tap & Go command is not processed within a predetermined response time (less than a second) after the sending of the Tap & Go command and the contactless transaction is thus aborted. That makes it necessary to wait for the processing of the user authentication command to end before repeating the transmission of the Tap & Go command at least once again via the physical contactless channel in order to obtain processing and a corresponding response.

SUMMARY

The invention removes the major drawback described above by providing a method to process at least two application commands from at least two physical communication channels respectively with a portable electronic device, and a portable electronic device that uses the method. According to the invention, the portable electronic device allocates a level of priority to each application command received and processes a series of application command or commands recently received that have higher priority over another series of application commands being processed.

More particularly, the invention is a method for processing at least two application commands from at least two physical communication channels respectively with a portable electronic device. The method comprises a stage where each application command from one of the physical communication channels is received, a stage where the level of priority associated with each applicative command is determined, a stage where the levels of priority are compared and a stage where the application command with the highest priority out of the application commands is determined and a stage where the application command with the highest priority is processed.

The general principle of the invention thus relies on a new approach in which the application commands are not processed according to their order of arrival, but according to the order of priority respectively given by the portable electronic device as the receiver of the commands.

It must be noted that as a result of the definition by the receiver of the order of priority of the application commands received, the portable electronic device may change the order of their processing in relation to their order of reception.

Consequently, such a change in the order of processing leads to the processing of an application command with priority over that initiated for current application commands, which have lower priority.

It can be understood that the result is the nested processing of a series of high-priority application commands and that of a series of application commands with lower priority.

The portable electronic device can thus process several application commands from different physical communication channels respectively, virtually simultaneously.

In that way, particularly when the processing required for an application command with higher priority than that under way requires high responsiveness, the processing of such a high-priority application command is initiated by the portable electronic device as soon as it is received for the first time. As a result, there is no postponement of the processing of the application command or commands with the highest priority. That leads to higher responsiveness than that resulting from the known solution described above.

Unlike the known solution described earlier, the solution in the invention thus avoids the running out of the predetermined response time for the processing of the high-priority application command or commands received after application commands that are being processed even when they have lower priority. Also, the solution in the invention further avoids the generation of another transmission of the same application command or commands with higher priority than those being processed.

According to another aspect, the invention is a portable electronic device capable of processing at least two application commands from at least two physical communication channels respectively. The device comprises means to process and communicate information.

According to the invention, the means for processing and communicating information are configured to provide a means to receive each application command from one of the two physical communication channels, a means to determine the level of priority associated with each of the application commands, a means to compare the levels of priority, a means to identify the application command with the highest priority out of the application commands and a means to process the application command with the highest priority.

The portable electronic device may for instance be a key of the USB type with at least one other communication interface, such as for instance a contactless interface of the ISO 14443 type.

Lastly, the invention relates to an electronic system with a host device cooperating with the portable electronic device as that mentioned before.

The host device may for instance be a PC. The portable electronic device may for instance be a dongle (which does not require a special reader to communicate with the PC) with a contact interface of the ISO 7816 type and at least one other communication interface, such as for instance an interface of the Bluetooth type.

BRIEF DESCRIPTION OF DRAWINGS

Other characteristics and benefits of the invention will become clear upon reading the description of a single preferential mode of embodiment of the invention, given merely for guidance as a non-limitative example, and viewing the enclosed drawings.

DETAILED DESCRIPTION

Figure 1:
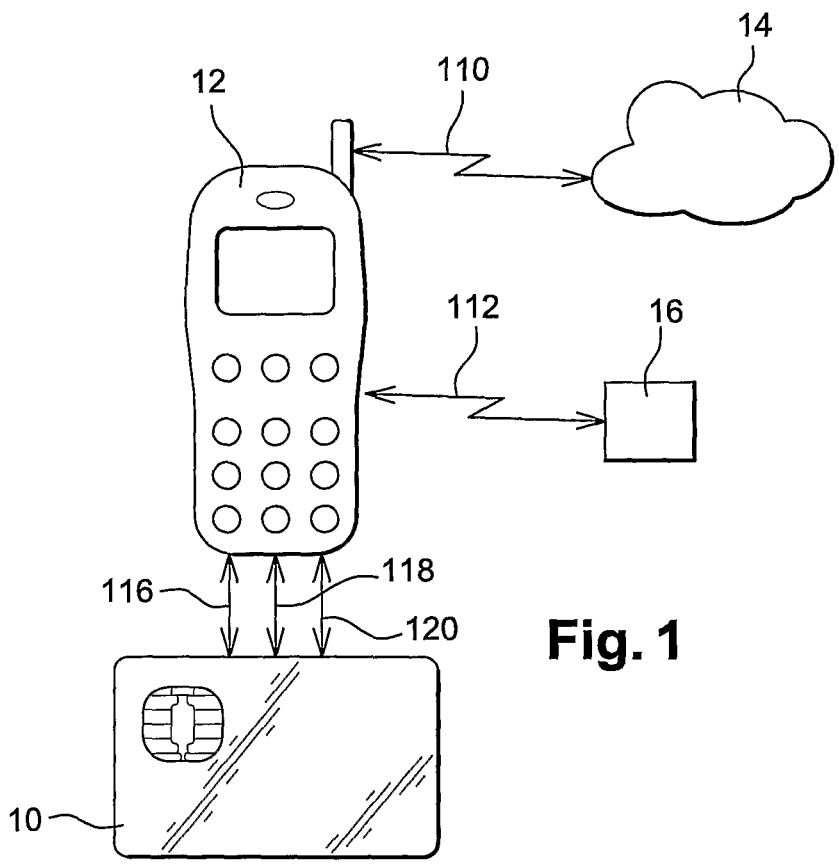
FIG. 1 is an electronic system that uses the invention.

As shown as an example in FIG. 1, an electronic system comprises a removable IC card 10 of the SIM type that is inserted in an IC card reader fitted in a mobile telephone 12.

The mobile telephone 12, in a manner known in itself, has a microprocessor that manages and controls all the means of the mobile telephone, and volatile and non-volatile memories that store permanent and temporary data and interfaces for communication with the outside.

The mobile telephone 12 is connected by a bidirectional radiofrequency link 110 to at least one base station of a wireless communication network 14 of the GSM (acronym for Global System for Mobile Communication) type.

The IC card 10 cooperates with the mobile telephone 12 to access the wireless network 14 managed by a wireless telephone operator. To do so, the mobile telephone 12 exchanges data about APDU application commands with the IC card 10 through a first physical channel 116 of the ISO 7816 contact type. The first physical channel 116 of the ISO 7816 contact type classically uses six electrical contacts located on one side of the IC card 10, and six corresponding electrical contacts in telephone 12.

The IC card 10 also cooperates with the mobile telephone 12 to access a transport service through a reader terminal 16 managed by a transport operator. To that end, the reader terminal 16 sends the mobile telephone 12 a command for the payment of a transport ticket, via a bidirectional radiofrequency link 112 using the so-called NFC (acronym for Near Field Communication) technology.

It must be noted that NFC technology is short-range technology, from 0 to 20 cm, using a frequency of 13.56 MHz.

The telephone 12 contains an RFID (acronym for Radio Frequency Identification) chip to receive the command for the payment of the transport ticket and reply to it. The telephone 12 sends on the command for the payment of the transport ticket to the IC card 10, encapsulating several APDU commands in an HDLC/HCI (acronym for High-level Data Link Control/Host Controller Interface) communication protocol. To do so, a second physical channel 118 of the contact SWP (acronym for Single Wire Protocol) type is used. The second contact SWP physical channel 118 uses a single electrical contact on the IC card 10 and a matching single electrical contact provided in telephone 12, to exchange data relating to APDU commands.

The IC card 10 also cooperates with telephone 12 to exchange data stored or to be stored on one or more memories of the IC card 10 through a third physical channel 120 of the USB type. The data exchanged in this way with the IC card 10 are also data relative to APDU commands. The third USB physical channel 120 uses two electrical contacts on the IC card 10, and two matching electrical contacts on the mobile telephone 12.

The IC card 10 is accessible from the outside by means of three physical communication channels 116, 118 and 120.

It is clear that the invention is not limited only to the physical communication channels used and described above, possibly through telephone 12, by the IC card 10 to exchange data relating to APDU commands with elements outside the IC card 10. The following may be listed for example:

a physical channel of the MMC (acronym for Multimedia Card) type;

a physical channel of the I2C (Inter Integrated Circuit) type;

a physical channel of the IEEE (acronym for Institute of Electrical & Electronics Engineers) 802.11 type;

a physical channel of the Bluetooth type; and/or a physical channel of the Zigbee type.

According to the invention, to process APDU commands from different physical channels respectively, which may compete with each other for processing, the IC card 10 defines a level of priority specific to each application command in the series of commands, and processes at least part of each APDU command in the series of commands according to its level of priority.

It must be noted that a series of commands may be made up of only one APDU command.

The IC card 10, after initiating the processing of a first APDU command received first that has a priority level below that of a second APDU command received later, compares their respective priority levels and determines the higher priority level of the two and gives preference to the processing of the APDU command with higher priority.

According to one mode of embodiment, the highest level of priority is that with the highest value. For example, if there are four types of APDU command, the level with the highest priority has value 4, and the level with the least priority has value 1.

On the contrary, according to another mode of embodiment, the highest level of priority is that with the lowest value. For example, if there are four types of APDU command, the level with the highest priority has value 1, and the level with the least priority has the value 4.

The priority level is defined according to one or more parameters.

According to an advantageous characteristic, the priority level of an APDU command depends on the physical channel through which the APDU command has been received by the IC card 10.

Figure 2:
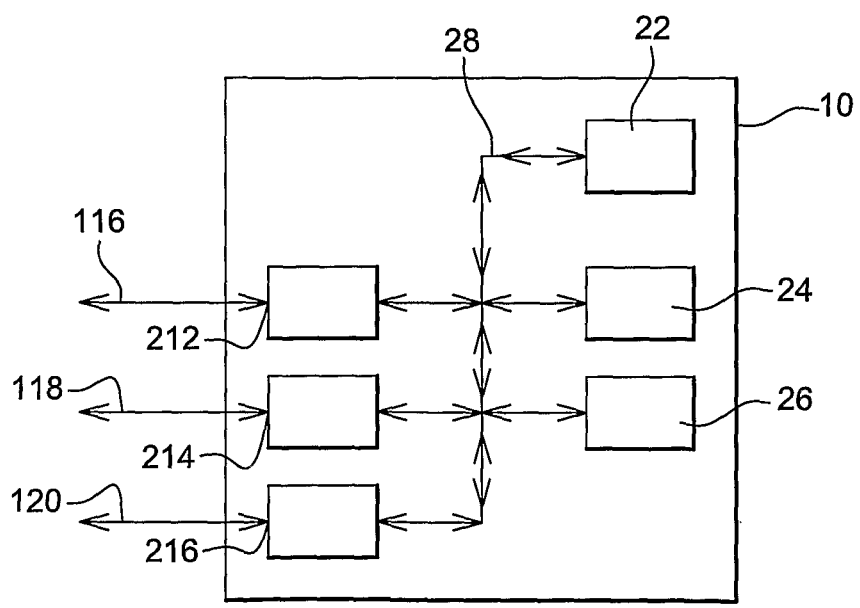
FIG. 2 is a more detailed drawing of a portable electronic device cooperating with the host device of the system illustrated in FIG. 1.

FIG. 2 shows in a more detailed manner a mode of embodiment of the la IC card 10 capable of exchanging data relating to APDU commands with the outside.

The IC card 10 has a microprocessor 22 that manages and controls particularly all the means of the IC card 10 that internally exchange data with each other through a bidirectional bus 28. The microprocessor 22 also manages and controls all the data relating to APDU commands received from the outside.

To exchange data relating to APDU commands with the outside, the IC card 10 has:

a first interface 212 of the ISO 7816 type for contact communication via the first physical channel 116 with the telephone 12;

a second interface 214 of the SWP type for contact communication via the second physical channel 118 with the telephone 12; and a third interface 216 of the USB type for contact communication via the third physical channel 120 with the telephone 12.

The IC card 10 has a volatile memory 24 and a non-volatile memory 26 that are used to store temporary and permanent data respectively. These are the specific data, particularly of an operating system that manages the hard and software resources of the IC card 10, and different programs that are required for the internal working of the IC card 10. Additionally, volatile memory 24 and non-volatile memory 26 store data specific to the different applications provided by the IC card 10.

Among others, the IC card 10 uses known applications for user identification, user authentication, access to a transport service, access to a restricted access area, electronic payment etc.

According to the invention, the operating system contains a software module that allocates a level of priority to each series of application command(s) received to decide either to process it (them) immediately or defer the processing, depending on the level of its (their) level of priority in relation to another series of application command(s) that is being processed.

The allocation of a level of priority optionally depends on a priority delay associated with a physical channel with lower priority, to which a response time is allocated after the transmission of an APDU command.

The software module includes an instruction program for the definition of the level of priority of the APDU commands for all the physical channels through which the IC card is accessible. Such a definition program is for example loaded, when the IC card 10 is customized in the factory and regularly updated after its delivery, for instance OTA (Over The Air), possibly with the update of each new application to be supplied by the IC card 10.

As a result, the IC card 10 processes the APDU commands received virtually simultaneously, in the decreasing order of their priority level, i.e. from the APDU commands with highest priority to those with the least priority It must be pointed out that a single microprocessor, which processes only one task at a time, is switched thanks to a task scheduler between different execution threads to execute or process them one after the other. Such a microprocessor is called a multi execution thread microprocessor with time distribution.

According to a first mode of embodiment, the operating system is of the multi execution thread type, where one execution thread is devoted to the communication of data relating to APDU commands for each physical communication channel, and one execution thread is devoted to the processing of APDU commands in the orders set by the scheduler.

Each execution thread for the communication of data relating to APDU commands processes the reception of APDU commands and the transmission of a corresponding response through the relevant physical channel.

As soon as a communication execution thread is informed of the reception of an APDU command, that execution thread sends a specific message via the scheduler to the APDU command processing execution thread indicating that a command is ready for processing.

To inform a communication execution thread of a given physical channel of the reception of an APDU command on the relevant channel, an interrupt is generated and it records the associated data and transmits an appropriate message to wake the communication execution thread responsible for that channel.

In its turn, the communication execution thread of the relevant physical channel that has been woken processes the message and sends it on to the APDU command processing execution thread, which executes the APDU command received under the control of the scheduler.

The scheduler follows the order set by the level of priority of the APDU commands.

When the APDU command processing execution thread is informed, it determines the level of priority of the command it has just received and if it is not executing or processing an APDU command, it immediately processes the APDU command last received.

If, on the other hand, the APDU command processing execution thread is already busy processing another APDU command, of which it knows the level of priority, and is informed that an APDU command just received is also ready to be processed, it compares the levels of priority of the two and identifies the level with the higher priority. If the APDU command being processed has higher priority than the one just received, the APDU command processing execution thread continues and completes the processing under way before processing the APDU command just received. The order of exit of responses relating to APDU commands received is the same as the order of entry of APDU orders.

If, on the contrary, the APDU command just received has higher priority than the one being processed, the execution thread ends the processing of the command under way and the data resulting from such processing are saved. Then the scheduler intervenes so that the APDU command processing execution thread processes the APDU command with higher priority that has just been received. As a result, the processing of any APDU commands from the same physical channel as that under way that follow the APDU command last treated is put off to the end of the processing of the APDU command with higher priority. To resume the processing of the APDU command or commands that follow the processing initiated for the APDU command processed first, the saved data are recovered in order to avoid any processing inconsistency. The order of exit of responses to the APDU commands received is thus the reverse of the order of entry of the APDU commands.

According to a second mode of embodiment, the operating system is a multi execution thread system, where one execution thread is devoted to the communication of the data relating to APDU commands for all the physical communication channels and one execution thread is devoted to the processing of APDU commands in the order set by the scheduler.

The second mode of embodiment is identical to the first one described earlier, with the exception that only one communication execution thread devoted to all the physical channels (and not several) addresses the APDU command processing execution thread under the control of the scheduler.

Figure 3:
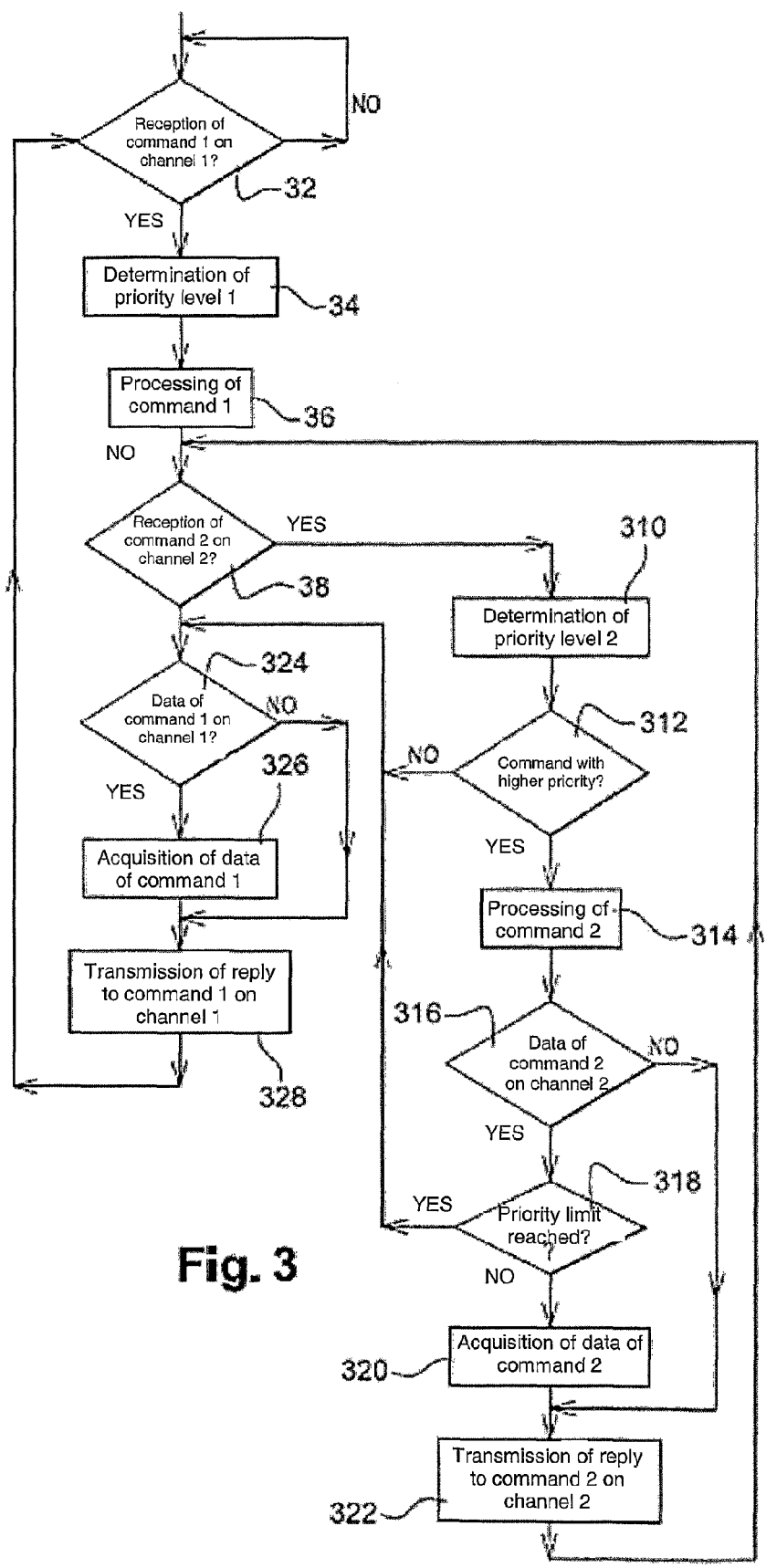
FIG. 3 is a simplified organization chart of an example of a method according to the invention.

FIG. 3 contains a chart showing an example of the processing method by the IC card 10 of several APDU commands received from two physical communication channels respectively.

The processing of APDU commands operates like an APDU server.

The chart starts with a reception standby loop 32 for an APDU command through one of the two physical channels, channel 116 of the ISO 7816 type and channel 118 of the HCI type.

After a first APDU command has been received, the IC card 10 determines 34 the level of priority allocated to the processing of the series of APDU commands from the relevant physical channel.

The IC card 10 starts 36 processing the first APDU command. The first APDU command may be followed by at least one other APDU command from the same physical channel.

At any time, another APDU command, the so-called second APDU command, may be received, following the interrupt mechanism explained above in relation with FIG. 2.

A check 38 is made to see if a second APDU command has been received through the second channel.

If a second APDU command is received via the second channel, the system moves to stage 310 of determining the level of priority of the second APDU command.

Otherwise, i.e. if no APDU command is received from another physical channel, the system goes on to stage 324 to continue processing the first APDU command from the second channel.

During stage 324, a test is made to see if data relating to the first APDU command must follow depending on the nature of the first APDU command.

Then, the IC card determines 312 if the second APDU command from the second channel has higher priority than the first APDU command from the first channel.

If the second APDU command followed by any other APDU commands on the second channel does not have higher priority than the first APDU on the first channel, the system moves on to aforementioned stage 324 relating to the treatment of the first APDU command from the first channel.

If the second APDU command from the second channel has higher priority for processing than the first APDU command relating to the first channel, the IC card starts 314 processing the second APDU command from the second channel.

After that, the IC card checks 316 if data specific to the second command (relating to the second channel) received are to be received according to the nature of the second APDU command from the second channel to be processed on priority basis.

If such data relating to the second command are to be received, the IC card tests 318 if a priority limit of the second channel has been reached.

According to an optional characteristic, a priority limit is defined for each physical channel accessing the IC card. The priority limit is determined by a predetermined number of APDU commands of the second physical channel, the processing of which has higher priority than that of APDU commands relating to the first physical channel, the processing of which has begun.

According to a variant, the priority limit is determined by a period of time during which the processing of the series of application commands relating to the second channel has higher priority than that of the series of application commands from the first channel, the processing of which has started.

According to another variant, the second channel becomes the physical channel with lower priority during the processing of a predetermined number of application commands relating to the first physical channel.

According to another variant, the second physical channel becomes the physical channel with lower priority for a predetermined time.

If the priority limit has not been reached, the system moves to stage 320 for the acquisition of data relating to the second APDU command from the second channel with higher priority.

If, on the contrary, the priority limit has been reached, the system loops back to just before stage 324 where it checks if there are data relating to the processing of APDU commands from the first channel.

During the acquisition stage 320, the data specific to the second command from the second channel with higher priority are retrieved.

If no data providing the parameters of the second APDU command relating to the second channel are expected, the system goes directly from stage 316 indicated above to the next stage 322, and transmits a response to the second APDU command.

In stage 322, the IC card transmits a response to the second APDU command received from the second physical channel via that same channel.

The IC card repeats the processing of any APDU command from the second channel with higher priority as long as any priority limit is not reached. To do so, it once again carries out stage 38 to run a reception test of a new second APDU command relating to the second channel for each APDU command of the series of APDU commands from the second channel, stage 310 to determine the level of priority associated with it, stage 312 to compare and identify the channel with the highest priority, stage 314 to process the second APDU command, stage 316 to run the data standby test, stage 318 to test the reaching of the priority limit, stage 320 to acquire the relevant data and stage 322 to transmit a corresponding response.

After a corresponding response is sent for each APDU command from the second channel, the IC card switches to the processing initiated earlier of the series of application commands. To do so, the IC card goes back to stage 324 to verify the presence of data relating to the APDU command of the first APDU command series relating to the first channel.

If no data providing the parameters of the APDU command from the first channel are to be expected, the system moves to stage 328 to transmit a response to the APDU command sent via the first channel.

If data relating to the first APDU command are to be expected due to the nature of the relevant APDU command, the IC card receives 326 the corresponding data providing the parameters of the APDU command relating to the first channel.

Where applicable, after transmitting a response to the first APDU command relating to the first channel via the first channel, the IC card loops back to the initial stage 32 to stand by for the reception of another first APDU command on the first channel.

After each APDU command in the series of APDU commands received via the second channel, at least part of them because of the priority limit set for the processing of the second channel, and each command in the series of APDU commands received via the first channel have given a matching reply transmitted on its respective channel, the processing of APDU commands received is complete till the next reception of a command on the first or second physical channel.

The process describe above only involves two physical communication channels.

It is clear that the man of the art is able, without any inventive activity, of implementing the process described on a number of physical channels that is greater than two.

To illustrate the method described above, it is applied to the first physical channel 116 of the ISO 7816 contact type and the second SWP physical channel 118, using the HCI communication protocol on the application level.

It must be remembered that an APDU command from the first physical ISO 7816 channel has a header defining the nature of the command, which is received first, followed in a second stage by the command parameter data. Such an APDU command from the first physical ISO 7816 channel is received in two separate parts of data.

It must be remembered that an APDU command from the second physical HCI channel has a header that also defines the nature of the command, followed at the same time, by the command parameter data.

Such an APDU command from the second physical ISO 7816 channel is received in just one block of data.

The IC card has defined that the processing of APDU commands from the HCI physical channel has priority over that of APDU commands from the ISO 7816 physical channel.

To do so, each APDU command from the HCI physical channel has a priority value of 2, whilst each APDU command from the ISO physical channel has a priority value of 1.

The IC card first receives a first APDU command via the ISO 7816 physical channel and begins to process it. The first APDU command is for example, a single command to verify the PIN number in a series of commands transmitted via the ISO 7816 channel and received by the IC card.

Before that, the user of the IC card has started an application requiring the authentication of the holder of the card. The user has thus entered a number that is meant to match that sent by the ISO 7816 reader in the parameter data of the command. Such entry of the number has led to the transmission by the reader of a first PIN verification APDU command through the ISO 7816 physical channel.

In a second stage, the IC card receives a second APDU command.

The second APDU command is made up of a command to select a file named "transport ticket", where "transport ticket" are the data that provide the parameters of the command. The second APDU command is, for example, the first APDU command in a series of three APDU commands to be processed from the second HCI physical channel.

The IC card first compares the priority levels of the APDU commands received from the first and second channels and finds that it must process the APDU commands from the second channel on a priority basis.

The IC card first executes the first APDU command that it has received in a header.

Then the IC card processes the "transport ticket" Select File command from the physical channel using the HCI protocol. Once it has been executed, the card sends a response via the second SWP channel, in the form of an OK message, confirming that it has effectively processed the Select File command which it has recognize and processed.

Then the IC card receives, through the second channel, another command from the second higher priority channel, made up of a command to read a file. The IC card sends a response via the second SWP channel that there are "three units" in the selected file.

Then the card receives anther command on the second channel, made up of the command to write "two units" in the selected file, to continue the contactless transaction.

On the second SWP physical channel, the card sends back a response in the form of an OK message confirming that it has effectively executed the write command recently processed, and deleted one credit unit, validating one transport ticket.

In the meantime, in every standby period from the start of the processing of APDU commands from the second HCI channel with higher priority, the IC card sends at least one standby command on the ISO 7816 physical channel to put off the transmission, that of data relating to the first APDU command for PIN verification in this case.

Then, once the three APDU commands received on the SWP physical channel have been processed, the IC card can go back to processing the second part of the first APDU command received on the ISO 7816 physical channel.

The IC card switches to process the commands from the first ISO 7816 physical channel and processes the single command in progress on the ISO 7816 physical channel.

On the first ISO 7816 physical channel, the IC card sends a reply in the form of an OK message, confirming that it has effectively executed the PIN verification command.

The IC card then receives the second part of the PIN verification command with the data providing the parameters of the command, via the first ISO 7816 physical channel.

The IC card processes the PIN verification command data.

If the data received are those entered by a user as their PIN code, the IC card then sends a reply via the first ISO 7816 physical channel in the form of an OK message, confirming that the PIN number is correct.

The invention claimed is:

1. A method using a portable electronic device for processing at least two application commands from at least two physical communication channels respectively, comprising:
    receiving each application command from one of the at least two physical communication channels,
    determining a level of priority associated with each of the application commands, said determining depending on the physical channel that has supplied the application command,
    comparing the levels of priority and identifying the application command with the highest priority between the application commands, and
    processing the application command with highest priority, wherein upon receiving the application command with the higher level of priority than the level of priority of the application command that is being processed, the application command with lower level of priority is processed, the processing of at least one subsequent application command with lower level of priority is suspended and the application command with highest level of priority received is processed immediately.

2. The method of claim 1, wherein following the processing of a first predetermined number of application commands from the physical channel with highest priority, the physical channel with highest priority becomes that with lowest priority during the processing of a second predetermined number of application commands.

3. The method of claim 1, wherein following the processing of a first predetermined number of application commands from the physical channel with highest priority, the physical channel with highest priority becomes that with lowest priority for a first predetermined period of time.

4. The method of claim 1, wherein determining the priority level further depends on a priority delay associated with one of the at least two physical channels.

5. The method of claim 1, wherein upon receiving the application command with the level of priority dependent on the physical channel that has supplied the application command, the physical channel is the physical channel with highest priority during a predetermined number of application commands.

6. The method of claim 1, wherein upon receiving the application command with the level of priority dependent on the physical channel that has supplied the application command, the physical channel is the physical channel with highest priority for a second predetermined period of time.

7. The method of claim 1, wherein when the processing of the at least one subsequent application command with lower level of priority is suspended, at least one standby command is transmitted on the physical channel associated with the subsequent at least one application command with lower level of priority.

8. The method of claim 1 wherein the application commands relate to at least one application supplied by the portable electronic device, the application being at least one selected from a group consisting of
    an application to identify the user or holder,
    an application to authenticate the user,
    an application to access a restricted access area or a transport service,
    an electronic payment application, and
    an application for communicating with a wireless telephony network.

9. A portable electronic device capable of processing at least two application commands from at least two physical communication channels respectively, the portable electronic device comprising:
    means to receive each application command from one of the physical communication channels,
    means to determine a priority level associated with each of the application commands, the priority level of the application command depending on the physical channel that has supplied the application command,
    means to compare the priority levels,
    means to identify the application command with highest priority among the application commands,
    means to process the application command with highest priority, wherein upon reception of the application command with the priority level higher than the priority level of the application command being processed, the processing means processes the application command with lower priority that is being processed, suspends the processing of at least one subsequent application command with lower priority and immediately processes the application command with highest priority.

10. The device of claim 9, wherein the processing means is configured to process:
    a first predetermined number of application commands from the physical channel with higher priority,
    a second predetermined number of application commands from a physical channel with lower priority.

11. The device of claim 9, wherein the processing means is configured to process:
    a first predetermined number of application commands from the physical channel with higher priority,
    at least one application command from a physical channel with lower priority for a first predetermined period of time.

12. The device of claim 9, in which the priority level further depends on a priority delay associated with the physical channel.

13. The device of claim 9, wherein upon reception of the application command with the priority level depending on the physical channel that has supplied the application command, the physical channel is the physical channel with highest priority for a predetermined number of application commands.

14. The device of claim 9, wherein upon reception of the application command with the priority level depending on the physical channel that has supplied the application command, the physical channel is the physical channel with highest priority for a second predetermined period of time.

15. The device of claim 9, wherein when the processing of at least one subsequent application command with lower priority is suspended, the device is configured to transmit at least one standby command on the physical channel associated with the said subsequent application command with lower priority.

16. The device of claim 9 wherein the application commands relate to at least one application supplied by the said portable electronic device, which application being at least one selected from a group consisting of
    an application to identify the user or holder,
    an application to authenticate the user,
    an application to access a restricted access area or a transport service,
    an electronic payment application, and an application for communicating with a wireless telephony network.

17. The device of claim 9 wherein the physical channels comprise at least one selected from a group consisting of
a communication channel of the ISO 7816 type,
a communication channel of the USB type,
a communication channel of the MMC type,
a contactless communication channel of the ISO 14443 type, and
a communication channel of the SWP type.

18. An electronic system comprising:
a host device operatively connected to at least one portable electronic device to process at least two application commands from at least two physical communication channels from outside the device,
wherein host the device comprises
means to receive each application command from one of the physical communication channels,
means to determine a priority level associated with each of the application commands, wherein the priority level of the application command depends on the physical channel that has supplied the application command,
means to compare the priority levels,
means to identify the application command with highest priority among the application commands, and
means to process the application command with highest priority,
wherein upon reception of the application command with a priority level higher than the priority level of the application command being processed, the processing means processes the application command with lower priority that is being processed, suspends the processing of at least one subsequent application command with lower priority and immediately processes the application command with highest priority.

19. The system of claim 18, wherein the processing means is configured to process:
a first predetermined number of application commands from the physical channel with higher priority,
a second predetermined number of application commands from the physical channel with lower priority.

20. The system of claim 18, wherein the processing means is configured to process:
a first predetermined number of application commands from the physical channel with higher priority,
at least one application command from a physical channel with lower priority for a first predetermined period of time.

21. The system of claim 18, wherein the priority level further depends on a priority delay associated with the physical channel.

22. The system of claim 18, wherein upon reception of the application command with a priority level depending on the physical channel that has supplied the application command, the said physical channel is the physical channel with highest priority for a predetermined number of application commands.

23. The system of claim 18, wherein upon reception of the application command with the priority level depending on the physical channel that has supplied the application command, the said physical channel is the physical channel with highest priority for a second predetermined period of time.

24. The system of claim 18, wherein during suspension of the processing of at least one subsequent application command with lower priority, the host device is configured to transmit at least one standby command on the physical channel associated with the said subsequent application command with lower priority.

25. The system of claim 18, wherein the application commands relate to at least one application supplied by the said portable electronic device, wherein the application is one selected from a group consisting of
an application to identify the user or holder,
an application to authenticate the user,
an application to access a restricted access area or a transport service,
an electronic payment application, and
an application for communicating with a wireless telephony network.

26. The system of claim 18, wherein each of the physical channels is one selected from the group consisting of
a communication channel of the ISO 7816 type,
a communication channel of the USB type,
a communication channel of the MMC type,
a contactless communication channel of the ISO 14443 type,
a communication channel of the I2C type,
a communication channel of the SWP type,
a communication channel of the IEEE802.11 type,
a communication channel of the Bluetooth type, and
a communication channel of the Zigbee type.

27. The system of claim 18 wherein, host device is a mobile telephone and the portable electronic device is an IC card.

* * * * *